United States Patent
Kotser (10) Patent No.: US 7,127,523 B2
(45) Date of Patent: Oct. 24, 2006

(54) SPANNING TREE PROTOCOL TRAFFIC IN A TRANSPARENT LAN

(75) Inventor: Yoav Kotser, Givatayim (IL)

(73) Assignee: Corrigent Systems Ltd., Tel Aviv (IL)

( * ) Notice: Subject to any disclaimer, the term of this patent is extended or adjusted under 35 U.S.C. 154(b) by 731 days.

(21) Appl. No.: 10/057,332

(22) Filed: Jan. 25, 2002

(65) Prior Publication Data

US 2003/0037162 A1   Feb. 20, 2003

Related U.S. Application Data (60) Provisional application No. 60/308,410, filed on Jul. 27, 2001.

(51) Int. Cl.
- G06F 15/173 (2006.01)
- G06F 15/177 (2006.01)
- H04L 12/28 (2006.01)
- H04L 12/56 (2006.01)

(52) U.S. Cl. .............. 709/238; 709/239; 709/221; 370/392; 370/395.1

(58) Field of Classification Search ............ 709/221, 709/238, 239; 370/395.1, 392
See application file for complete search history.

(56) References Cited

U.S. PATENT DOCUMENTS

| | | | |
|---|---|---|---|
| 6,032,194 A * | 2/2000 | Gai et al. | 709/239 |
| 6,205,488 B1 * | 3/2001 | Casey et al. | 709/238 |
| 6,275,493 B1 | 8/2001 | Morris et al. | |
| 6,304,575 B1 * | 10/2001 | Carroll et al. | 370/408 |
| 6,339,595 B1 * | 1/2002 | Rekhter et al. | 370/392 |
| 6,466,985 B1 * | 10/2002 | Goyal et al. | 709/238 |
| 6,604,136 B1 | 8/2003 | Chang et al. | |
| 6,628,624 B1 * | 9/2003 | Mahajan et al. | 370/256 |
| 6,760,775 B1 | 7/2004 | Anerousis et al. | |
| 6,765,921 B1 * | 7/2004 | Stacey et al. | 370/401 |
| 6,778,496 B1 | 8/2004 | Meempat et al. | |
| 6,879,594 B1 * | 4/2005 | Lee et al. | 370/408 |
| 6,886,043 B1 | 4/2005 | Mauger et al. | |
| 2002/0176450 A1 | 11/2002 | Kong et al. | |
| 2004/0202171 A1 * | 10/2004 | Hama | 370/395.1 |

OTHER PUBLICATIONS

Rosen et al., Request for Comments (RFC) 3032 of the Internet Engineering Task Force (IETF), "MPLS Label Stack Encoding", Jan. 2002.

Martini, et al., in an IETF Draft Entitled: "Encapsulation Methods for transport of layer 2 Frames over MPLS", May 2002. (Available at: search.ietf.org/internet-drafts/draft-martini-l2circuit-mpls-06.txt.).

Martini, et al., Internet Draft, entitled: Transport of Layer 2 Frames over MPLS, May 2001. (Available at: search.ietf.org/internet-drafts/draft-martini-l2circuit-mpls-06.txt.).

(Continued)

*Primary Examiner*—Rupal Dharia
*Assistant Examiner*—Ranodhi Serrao
(74) *Attorney, Agent, or Firm*—Darby & Darby (57) ABSTRACT

A method for controlling a system of label-switched tunnels through a communication network, the method including pushing a signaling label onto a signaling frame at a first node in the network, and sending the signaling frame through the label-switched tunnels to one or more recipient nodes in the network. The signaling label is popped off the signaling frame at the one or more recipient nodes, which responsive to the signaling label, process the signaling frame so as to eliminate loops formed by the label-switched tunnels.

19 Claims, 4 Drawing Sheets

OTHER PUBLICATIONS

"IEEE Standard for Information Technology, Telecommunications and Information Exchange between Systems, Local and Metropolitan Area Networks, Common Specifications, Part 3: Media Access (MAC) Bridges", Published as ANSI/IEEE Standard 802.1D (1998).

Rosen et al., RFC 3031 of the IEFT, entitled: "Multiprotocol Label Switching Architecture", Jan. 2001. (Available at www.ietf.org/rfc.html).

Senevirathne, "Use of Partial Mashed Tunnels to Achieve Forwarding Behavior of Full Meshed Tunnels", Jun. 2001. (Available at: search.ietf.org/internet-drafts/draft-tsenevir-l2vpn-pmesh-00.txt.).

Lasserre et al., "Transparent VLAN Services Over MPLS", Jul. 2002. (Available at: search.ietf/org/internet-drafts/draft-lasserre-tls-mpls-00.txt.).

* cited by examiner

SPANNING TREE PROTOCOL TRAFFIC IN A TRANSPARENT LAN

CROSS-REFERENCE TO RELATED APPLICATIONS

This application claims the benefit of U.S. Provisional Patent Application No. 60/308,410, filed Jul. 27, 2001, which is incorporated herein by reference.

FIELD OF THE INVENTION

The present invention relates generally to communication networks, and specifically to methods and systems for enabling spanning tree protocol traffic over a network using label switching.

BACKGROUND OF THE INVENTION

Local Area Networks (LANs) connect computing systems together. LANs of all types can be connected together using Media Access Control (MAC) bridges, as set forth in the "IEEE Standard for Information Technology, Telecommunications and Information Exchange between Systems, Local and Metropolitan Area Networks, Common Specifications, Part 3: Media Access Control (MAC) Bridges," published as ANSI/IEEE Standard 802.1D (1998), which is incorporated herein by reference. The 802.1D standard is available at standards.ieee.org/catalog/IEEE802.1.html.

Each computing system connects to a LAN through a MAC device. MAC bridges that implement the 802.1D standard allow MAC devices attached to separate LANs to appear to each other as if they were attached to a single LAN. A MAC bridge functions within the Logical Link Control (LLC) sublayer of the Network Layer defined in ISO/IEC standard 7498-1: 1994, entitled "Information Processing Systems—Open Systems Interconnection—Basic Reference Model—Part 1: The Basic Model" (available from the American National Standards Institute, New York, N.Y.), which is incorporated herein by reference. The bridge includes two or more MAC devices that interconnect the bridge ports to respective LANs.

MAC bridges utilize a database to map destination MAC addresses located in the packets to bridge ports. The bridge builds the database by means of a learning process, in which it associates the source MAC address of each incoming packet with the port on which the packet was received. When the bridge receives an incoming packet whose destination address is not located in the database, it broadcasts the packet on all its available ports, except the one the packet arrived on. MAC bridges that do not recognize the destination address will further broadcast the packet. Through the broadcast mechanism, the packet will eventually traverse all interconnected bridges at least once.

Loops in the network topology can cause these broadcast packets to flood the network. If the packet's destination address is not recognized at any point in the loop, the packet will continue to traverse the loop forever. The topology of bridge interconnections must be managed to avoid such loops. The easiest topology to manage is a fully-meshed network, in which every MAC bridge is connected to every other one, and a packet broadcast by an initial bridge will not be further broadcast by the receiving bridges. However, a fully-meshed network is difficult to justify economically and to maintain, especially as some of the network nodes may be located at large distances from each other.

The IEEE 802.1D standard proposes an alternative to fully-meshed networks by specifying an implementation of a spanning tree algorithm to trim network paths that cause loops, along with a communication protocol, known as spanning tree protocol (STP), for managing the creation and updating of the network topology. STP ensures that all data paths in a network of bridges are free of loops by disabling forwarding of packets through certain interfaces. The spanning tree algorithm and protocol thus configure a simply-connected active topology from the arbitrarily-connected components of the network. The spanning tree algorithm takes advantage of a standard feature of MAC ports: the ports may be either in a blocking state or a forwarding state. Frames are forwarded through ports in a MAC bridge in the forwarding state, and not through ports in the blocking state. At any time, bridges effectively connect just the LANs to which ports in a forwarding state are attached. Ports that are in a blocking state do not forward frames.

The spanning tree algorithm defines one bridge in the network as the root bridge. Each LAN connected to the network has a bridge port that connects it to the root bridge. The port is known as the designated port for the LAN, and the bridge of which the designated port is part is known as the designated bridge for the LAN. The root bridge is the designated bridge for each LAN to which it is connected. Each bridge has a port defined as the root port, which uniquely connects the bridge to the root bridge. All ports on the bridge that are neither the root port nor the designated port are put into the blocking state. In determining which port should be used as the root port, STP defines a path cost associated with each path out of the ports in a bridge. The sum of the active path costs from a designated bridge port to the root bridge is defined as the root path cost. STP also defines a priority for each port on each bridge. In its simplest form, the port priority is the numerical value of the port identifier. If there is more than one possible path from a designated bridge port to the root bridge, STP specifies that the path with the lowest cost will be chosen. Frames destined to cross the network will travel from the originating LAN's designated bridge along a root path toward the root bridge. If the destination bridge does not lie along the root path, the frame will be routed through the root bridge and travel along a root path from the root bridge to the designated port for the destination LAN.

STP defines a method of communicating the information necessary for computing root paths in a network. MAC bridges that conform to the IEEE 802.1D standard transmit control information using bridge protocol data units (BPDUs). A MAC frame conveying a BPDU is received by all the bridges connected to the LAN on which the frame is transmitted. BPDUs are not directly forwarded by bridges, but the information in them may be used by a bridge in calculating its own BPDU to transmit, and may stimulate that transmission. The STP uses configuration BPDUs to determine the network topology, as is laid out in the IEEE 802.1D standard (section 8.3.2):

"Each configuration BPDU contains, among other parameters, the unique identifier of the bridge that the transmitting bridge believes to be the root, the cost of the path to the root from the transmitting port, the identifier of the transmitting bridge, and the identifier of the transmitting port This information is sufficient to allow a receiving bridge to determine whether the transmitting port has a better claim to be the designated port on the LAN on which the configuration BPDU was received than the port currently believed to be the designated port, and to determine whether the receiving port should become the root port for the bridge if it is not already.

"Timely propagation throughout the bridged LAN of the necessary information to allow all bridge ports to determine their state (blocking or forwarding) is achieved through three basic mechanisms:

"a) A bridge that believes itself to be the root (all bridges start by believing themselves to be the root until they discover otherwise) originates configuration messages (by transmitting configuration BPDUs) on all the LANs to which it is attached, at regular intervals.

"b) A bridge that receives a configuration BPDU on what it decides is its root port conveying better information (i.e., highest priority root identifier, lowest root path cost, highest priority transmitting bridge and port), passes that information on to all the LANs for which it believes itself to be the designated bridge.

"c) A bridge that receives inferior information, on a port it considers to be the designated port on the LAN to which it is attached, transmits its own information in reply, for all other bridges attached to that LAN to hear.

"Hence, spanning tree paths to the bridge with highest priority root identifier are quickly learned throughout the bridged LAN, with inferior information about other potential roots and paths being contradicted."

STP is guaranteed to converge within a finite period of time on a network topology with no loops, given an arbitrary initial topology. The IEEE 802.1D standard further defines an aging mechanism, whereby the configuration information is rendered invalid after a fixed period of time. The root bridge periodically transmits configuration BPDUs, which refresh the configuration information of all bridges in the network. A bridge that does not receive configuration information after the validity of its information has expired, will independently retransmit configuration BPDUs, thus reconfiguring the network in the case of topology changes.

Multiprotocol Label Switching (MPLS) is gaining popularity as a method for efficient transportation of data packets over connectionless networks, such as Internet Protocol (IP) networks. MPLS is described in detail by Rosen et al., in Request for Comments (RFC) 3031 of the Internet Engineering Task Force (IETF), entitled "Multiprotocol Label Switching Architecture" (January, 2001), which is incorporated herein by reference. This RFC, as well as other IETF RFCs cited hereinbelow, is available at www.ietf.org/rfc.html. In conventional connectionless packet routing, each router along the path of a packet sent through the network analyzes the packet header and independently chooses the next hop for the packet by running a routing algorithm. In MPLS, however, each packet is assigned to a Forwarding Equivalence Class (FEC) when it enters the network, depending on its destination address. A short, fixed-length label, allocated to the FEC to which the packet belongs, is pushed onto the top of a label stack, which is attached to the packet at the FEC ingress point. All packets in a given FEC are passed through the network over the same path by label-switching routers (LSRs). Unlike IP routers, LSRs simply use the packet label as an index to a look-up table, which specifies the output interface for the packet and the label that the LSR should attach to the packet for the next hop. The LSR pops the top label off the label stack, pushes another label (indicated by the popped label) onto the stack, and sends the modified packet through the specified interface (also indicated by the popped label) to the next hop.

The packet label is defined by Rosen et al. in Request for Comments (RFC) 3032 of the Internet Engineering Task Force (IETF), entitled "MPLS Label Stack Encoding" (January, 2001), which is incorporated herein by reference. The label includes a stack flag to indicate to the LSR whether the current label is the last on the stack. If the stack is empty, the LSR should be able to route the packet locally using the normal packet header.

The flow of packets along a label-switched path (LSP) under MPLS is completely specified by the label applied at the ingress of the path. A LSP is essentially a tunnel through the network, useful in network traffic management and communication security. MPLS tunnels are established by "binding" a particular label, assigned at the ingress node to the network, to a particular FEC.

Lasserre et al. describe a method to create a virtual LAN using a MPLS network in "Transparent VLAN services over MPLS" (July 2001), which is incorporated herein by reference. This document is available at search.ietf.org/internet-drafts/draft-lasserre-tls-mpls-0 0.txt. A transparent LAN service (TLS) provides bridge-like functionality between multiple sites over a large network. Users connect to the TLS via regular node interfaces, and LSP(s) between the nodes to which the users are connected form the TLS entity itself. Every node in a TLS acts as a virtual bridge. A virtual bridge node has "virtual ports," which are the endpoints of LSPs that are part of the TLS. The interfaces to which the users are actually connected are "real" ports. Both virtual and real interfaces are treated identically from the point of view of bridge processing (frame forwarding policies and loops prevention). A single LSP can participate in multiple TLS instances, each belonging to a different user.

The TLS network topology is completely specified by the LSP connections, which in turn depend on the MPLS protocol to actually transfer the packets through the virtual tunnels. Since MPLS networks supply an alternative, virtual implementation of layer 2 network communications, TLS can be thought of as parallel to conventional virtual bridged local area networks, as specified in the IEEE 802.1Q standard. From the perspective of the end user, a TLS network is transparent. The user is provided with the illusion that the LSPs are single-hop connections between adjacent routers.

TLS networks are still in the development stage. No clear standards for loop prevention in user-created TLSs exist. Loops can be caused by many events. Transient network outages or network topology changes can trigger establishment of new LSPs. These new LSPs could cause loops in a partial-mesh TLS network topology, due to either accidental misconfiguration or an intentional (though misguided) attempt at establishing backup LSPs. Users may have backup connections on top of a service provider network, for retaining network connectivity between sites even when the service provider network has partially or completely failed, and these connections may also cause loops. (Users can avoid creating such loops by running STP in their own network domain.)

One possible solution to removing loops in TLS topologies is to configure the TLS network as a full mesh of tunnels, as suggested by Lasserre et al. in the above-mentioned draft, but the full-mesh topology is costly and difficult to maintain. Another solution is to run STP on the user and service provider networks together. This approach has security and reliability drawbacks, however, from both the user's and the service provider's perspectives, and is excessively complex to configure.

Senevirathne describes alternative solutions for optimizing use of network tunnels in "Use of Partial Meshed Tunnels to Achieve Forwarding Behavior of Full Meshed Tunnels" (June 2001), which is incorporated herein by reference. This document is available at search.ietf.org/internet-drafts/draft-tsenevir-l2vpn -pmesh-00.txt. In the context of tunnel-based virtual private networks, Senevirathne describes a number of possible methods for building loop-free network graphs, including an implementation of the spanning tree algorithm. His approach is largely theoretical, however, and does not relate to issues of separation of provider and user domains, such as the particular problem of avoiding loops in the combined provider/user network.

When packets are passed through a MPLS tunnel, the routing label is removed at the egress node, which then simply routes the packet over its next hop using the packet's IP header. There is no need for the label to tell the egress node what to do with the packet, since the existing packet header, which was applied to the packet before it entered the tunnel, provides all of the necessary information. When layer 2 packets, such as Ethernet frames or ATM cells, are sent through a MPLS tunnel, however, the standard layer 2 media access control (MAC) header that brought the packet to the ingress node does not contain all the information that the egress node requires for delivering the packet to its destination. Thus, normal MPLS traffic does not contain any information about which TLS it belongs to.

Martini, in section 5 of "Encapsulation Methods for Transport of Layer 2 Frames Over IP and MPLS Networks" (July 2001), which is incorporated herein by reference, describes a method to encode TLS information into a packet. This document is available at search.ietf.org/internet-drafts/draft-martini-l2circuit-e ncap-mpls-03.txt. An extra label is pushed onto the label stack with an agreed-upon value encoding a descriptor of the TLS. The extra label is referred to as a virtual channel label, since it uniquely identifies the channel connecting two MPLS routers. Additional routing labels are pushed on top of the stack and popped off again as the packet traverses the MPLS system. The egress router receives the packet with the virtual channel label at the top of the label stack. The router examines the label, and uses the agreed-upon value to determine to which TLS the packet belongs. Martini describes a framework for distributing the agreed-upon values using the MPLS Label Distribution Protocol (LDP).

Martini describes a further use of packet encapsulation in "Transport of Layer 2 Frames Over MPLS" (July 2001), which is also incorporated herein by reference. This document is available at search.ietf.org/internet-drafts/draft-martini-l2circuit-t rans-mpls-07.txt. In most MPLS networks, the full address space of a MPLS label is not required to uniquely specify a single TLS. The unused bits in the address space can be used to encode Protocol Data Units (PDUs) of layer 2 protocols into the same MPLS label that carries the agreed-upon TLS identifier. The routers agree upon the PDU encoding using the above-mentioned LDP.

SUMMARY OF THE INVENTION

It is an object of some aspects of the present invention to provide an improved method for preventing loops in a TLS network.

In preferred embodiments of the present invention, the spanning tree protocol (STP) is implemented in a TLS network by sending STP signaling along the data paths through the MPLS tunnels making up the network. In other words, STP frames are sent through the same tunnels as the user traffic, but are distinguished from the user data frames by a special STP label. Loop removal is carried out in this way for each one of the TLSs, so that each TLS has its own loop-free topology. Using this method, the TLS network operator is able to ensure that there are no loops in the core network, irrespective of loops that users may add when they connect their own equipment to the network.

Any given TLS in a TLS network has its own set of related MPLS LSPs, and each LSP has a dedicated label used to encapsulate all the user traffic that it carries between TLS nodes. In preferred embodiments of the present invention, the same LSPs and corresponding labels are used to carry STP traffic. Thus, the STP frames move through each TLS in the exact way the user data frames flow in the TLS, in a manner similar to conventional MAC bridges. Because STP is carried out in the data plane, rather than in a separate control plane as proposed by Senevirathne, failures in the data plane are reflected immediately in STP traffic. In methods that separate the data and control planes, such failures may be impossible to detect.

In a preferred embodiment of the present invention, an underlying label is added to STP frames, carrying a unique identifier that is reserved for STP traffic. The stack flag is set in the MPLS header that is pushed onto the label stack of the STP frames above the special STP label, indicating to the receiver LSR that it should examine the underlying label. The LSR identifies the special label, and sends the encapsulated frame to its STP processing unit. Any STP frames generated in response will likewise be encapsulated with a special label stack and sent to the TLS LSPs.

There is therefore provided, in accordance with a preferred embodiment of the present invention, a method for controlling a system of label-switched tunnels through a communication network, the method including:

pushing a signaling label onto a signaling frame at a first node in the network;

sending the signaling frame through the label-switched tunnels to one or more recipient nodes in the network;

popping the signaling label off the signaling frame at the one or more recipient nodes; and responsive to the signaling label, processing the signaling frame at the one or more recipient nodes so as to eliminate loops formed by the label-switched tunnels.

In a preferred embodiment, the label-switched tunnels include multiprotocol label switching (MPLS) tunnels.

Preferably, pushing the signaling label includes inserting an agreed-upon value in the signaling label indicating that the signaling frame belongs to a protocol for eliminating the loops formed by the label-switched tunnels in a transparent local area network system (TLS), and popping the signaling label includes determining that the signaling frame is to be processed in accordance with the protocol responsive to the agreed-upon value in the signaling label.

Preferably, the signaling frame is generated and processed in accordance with a spanning tree protocol (STP), and processing the signaling frame includes setting a transmitting state for each one of the label-switched tunnels. Most preferably, the label-switched tunnels are used in a transparent local area network system (TLS), and (if a loop is found) for at least one of the label-switched tunnels, the transmitting state is set to a blocking state so as to prevent frames from being sent across the at least one of the label-switched tunnels, in order to eliminate a loop in the TLS. Additionally or alternatively, for at least one of the label-switched tunnels, the transmitting state is an active state so as to allow frames to be sent across the at least one of the label-switched tunnels.

Preferably, sending the signaling frame includes sending the signal frame through the label-switched tunnels that are used for carrying user data. Further preferably, the label-switched tunnels are arranged to provide a virtual bridge service for carrying the user data, most preferably a transparent local-area network service (TLS). Typically, the TLS is one of a plurality of transparent local-area network services (TLSs) operative in the communication network, and pushing the signaling label includes pushing information identifying the signaling frame with one of the plurality of TLSs, and eliminating the loops includes eliminating the loops from the one of the plurality of TLSs that corresponds to the signaling frame.

In a preferred embodiment, pushing the information identifying the signaling frame includes pushing a channel label onto the signaling frame along with the signaling label, and popping the signaling label includes additionally popping the channel label off the signaling frame, and processing the signaling frame includes processing the channel label together with the signaling frame.

In another preferred embodiment, pushing the information identifying the signaling frame includes adding the information to the signaling label, and processing the signaling frame includes processing the information identifying the signaling frame from the signaling label together with the signaling frame.

There is also provided, in accordance with a preferred embodiment of the present invention, a communication device for operation as one of a plurality of nodes in a communication network, the device including:

one or more ports, adapted to send and receive traffic via label-switched tunnels through the communication network; and a traffic processor which is coupled to the one or more ports, and is adapted to carry out a protocol for eliminating loops formed by the label-switched tunnels by pushing a signaling label onto a signaling frame and sending the signaling frame through at least one of the ports via the label-switched tunnels to one or more recipient nodes in the network, causing the recipient nodes to pop the signaling label off the signaling frame and responsive to the signaling label, to process the signaling frame so as to eliminate the loops formed by the label-switched tunnels.

The present invention will be more fully understood from the following detailed description of the preferred embodiments thereof, taken together with the drawings in which:

DETAILED DESCRIPTION OF PREFERRED EMBODIMENTS

Figure 1:
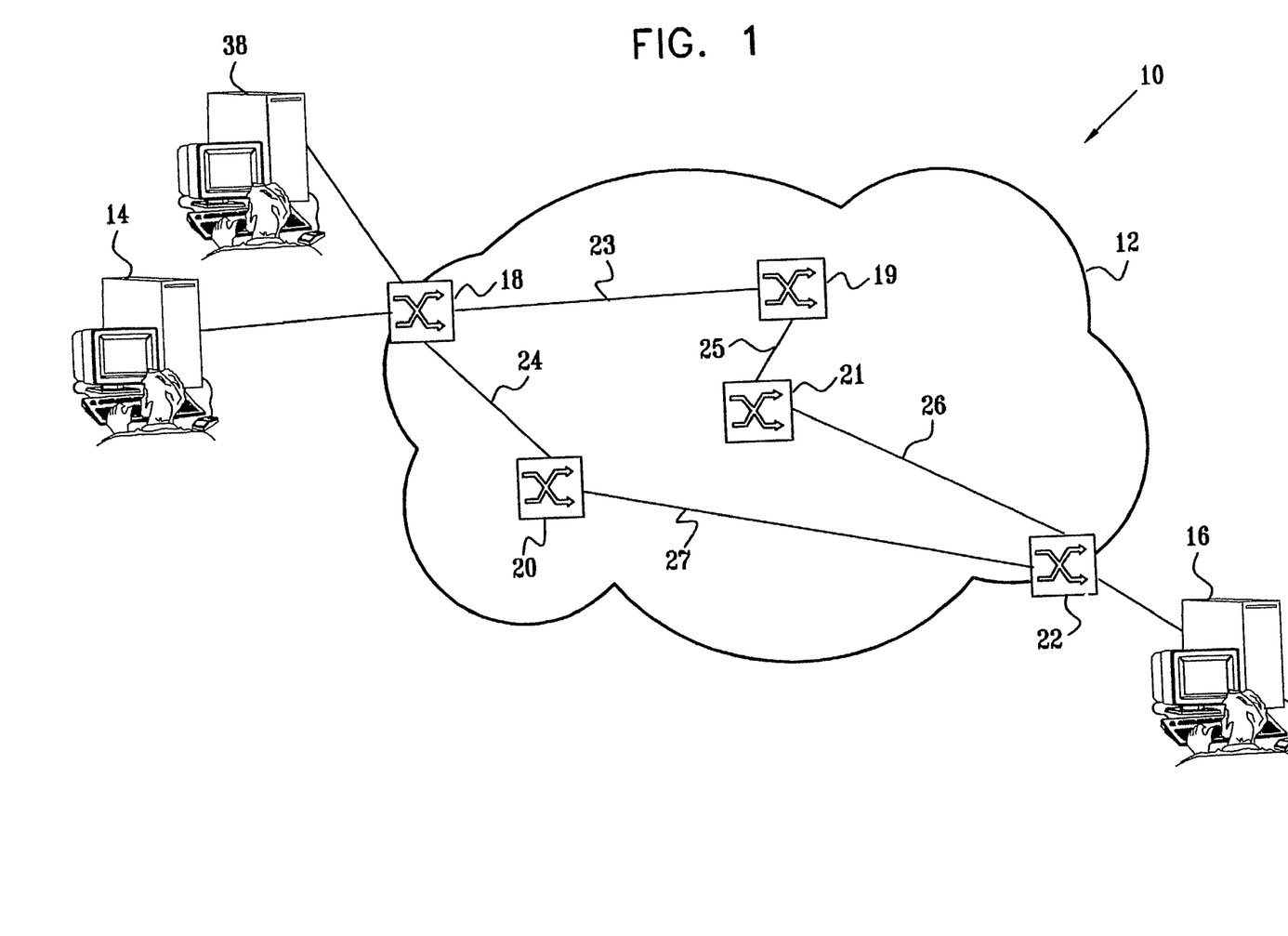
FIG. 1 is a block diagram that schematically illustrates a Multi-Protocol Labeled Switching (MPLS) system configured for Transparent LAN Service (TLS), in accordance with a preferred embodiment of the present invention.

FIG. 1 is a block diagram that schematically illustrates a Multi-Protocol Labeled Switching (MPLS) system 10 enhanced so as to enable it to transmit encapsulated configuration bridge protocol data units (BPDU), in accordance with a preferred embodiment of the present invention. This figure illustrates, by way of example, a point-to-point Transparent LAN Service (TLS) network 12 connecting between a first user 14 and a second user 16. Users 14 and 16 are connected by Label Switching Routers (LSRs) 18, 19, 20, 21 and 22 across Label Switching Paths (LSPs) 23, 24, 25, 26 and 27. Labeled packets originating from user 14 and destined for user 16 cross a set of the LSPs, as is known in the art.

Figure 2:
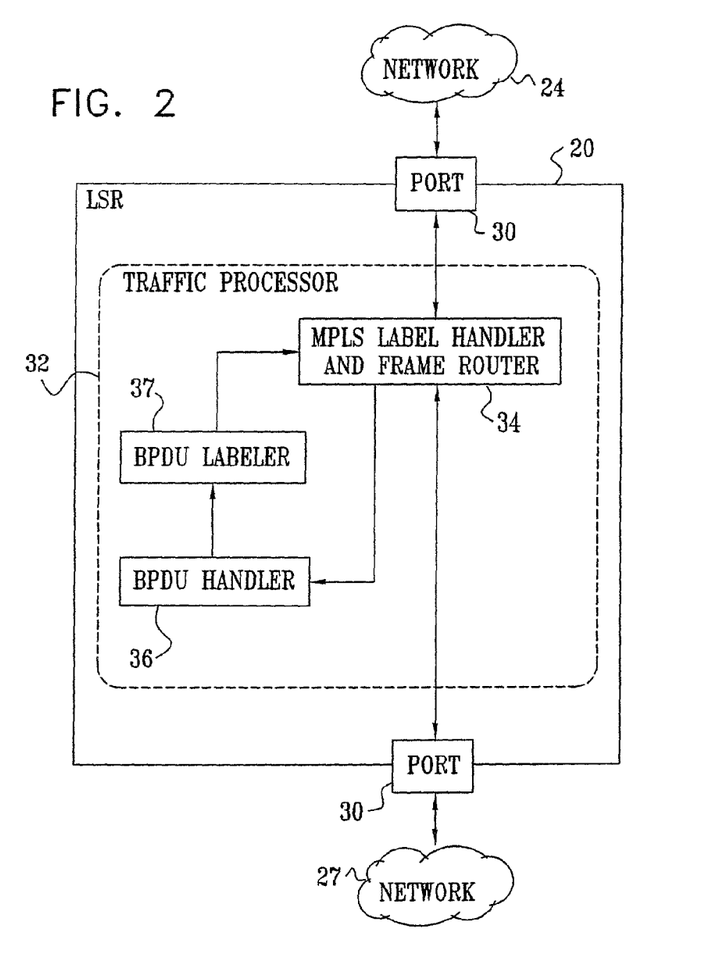
FIG. 2 is a block diagram that schematically illustrates functional elements of a label switching router (LSR), in accordance with a preferred embodiment of the present invention.

FIG. 2 is a block diagram that schematically illustrates functional elements of the LSRs in system 10 (say LSR 20), in accordance with a preferred embodiment of the present invention. The LSR uses ports 30 to connect to network segments 24 and 27. A traffic processor utilizes a MPLS label handler and frame router 34 to route frame traffic between the ports. The MPLS label handler pops a top-level label off the MPLS frame, and processes the frame accordingly. At network startup, and at intervals determined by the spanning tree protocol (STP), the traffic processor initiates a STP process to eliminate loops in TLS network 12. For this purpose, the traffic processor creates configuration BPDUs using a BPDU handler component 36, as described in the above-mentioned IEEE 802.1D standard. The traffic processor then encapsulates the BPDU for transmission over MPLS 10 using a BPDU labeler component 37, and passes the encapsulated BPDU to the MPLS label handler and frame router to be transmitted across TLS network 12. Incoming MPLS frames are transferred to the BPDU handler if a special label is found by the MPLS label handler.

Although traffic processor 32 is shown in FIG. 2 as comprising a number of different functional blocks, these blocks are typically implemented as software processes on a common central processing unit (CPU) in LSR 20. Alternatively, some or all of these blocks may be implemented as separate hardware elements. Only those elements of LSR 20 that are essential to an understanding of the present invention are shown in FIG. 2. The remaining blocks that must be added to the LSR will be apparent to those skilled in the art.

Figure 3:
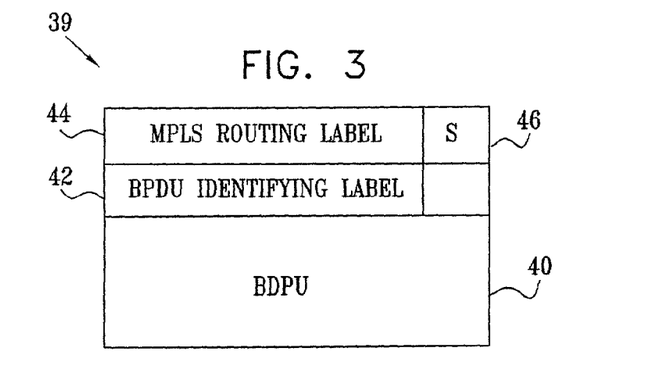
FIG. 3 is a schematic diagram that illustrates encapsulation of a configuration bridge protocol data unit (BPDU) used in a Spanning Tree Protocol (STP), in accordance with a preferred embodiment of the present invention.

FIG. 3 is a schematic diagram that illustrates a MPLS frame 39 that encapsulates a configuration BPDU 40 used in STP, according to the preferred embodiment of the present invention. MPLS routing labels, as described generally by Rosen et al., are pushed onto a label stack above BPDU 40. The first label is a specialized BPDU identifying label 42, comprising an agreed upon value signifying that the underlying data is a BPDU. This label will enable LSRs in system 10 to identify frame 39 as a STP frame, rather than a normal data frame. A further MPLS destination label 44 is pushed onto the label stack at each LSR, in accordance with conventional MPLS routing procedures. This is the same label as is used for user data frames carried between users of TLS network 12. A stack flag bit 46 is set in destination label 44 to indicate that the receiving LSR should pop the next-level label off the label stack and examine it, in order to discover the BPDU identifying label and perform the required STP processing.

Figure 4A:
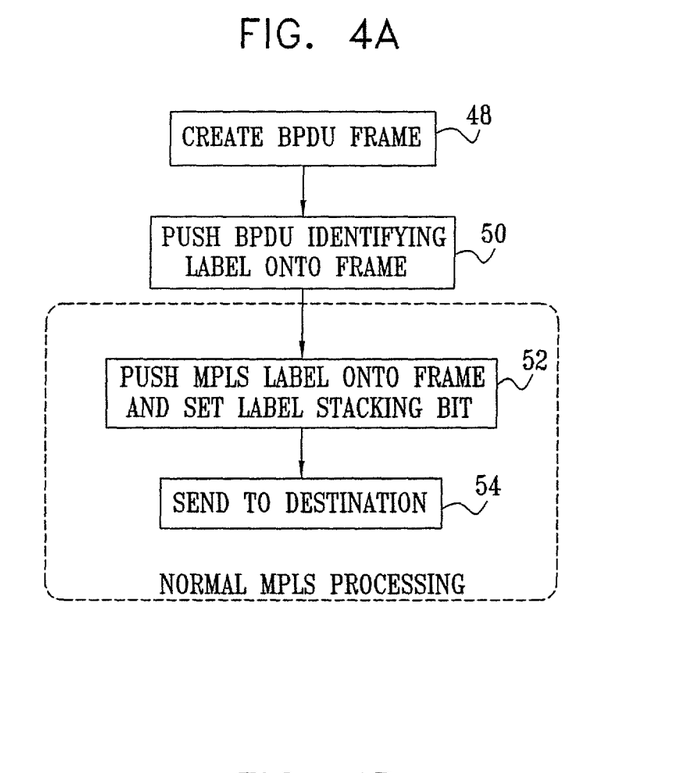
FIG. 4A is a flow chart that schematically illustrates a method for sending a BPDU used in a STP over a MPLS system, in accordance with a preferred embodiment of the present invention.

FIG. 4A is a flow chart that schematically illustrates a method for sending BPDU 40 used in a STP over MPLS system 10, in accordance with a preferred embodiment of the present invention. At a create BPDU frame step 48, BPDU handler 36 in the LSR (FIG. 2) creates a BPDU frame, in accordance with the STP described in the Background of the Invention. A BPDU identifying label is pushed onto the label stack at a push label step 50. MPLS destination label 44, with its label stacking bit set, is pushed onto the label stack at a label push step 52. At a send step 54, the encapsulated BPDU frame is sent to the next LSR along the appropriate LSP. Although the method of encapsulating BPDU 40 in frame 39 at steps 48 and 50 is novel, both push label step 52 and send step 54 are part of normal MPLS processing, as is known in the art.

Figure 4B:
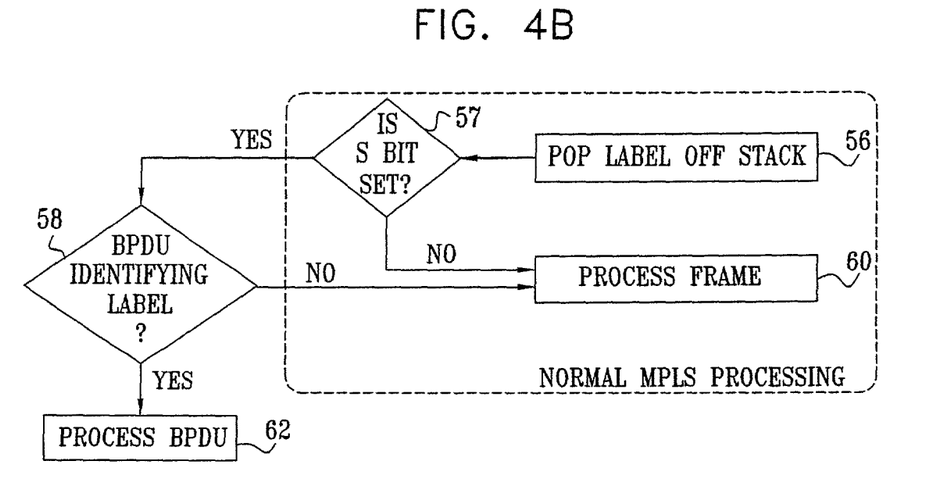
FIG. 4B is a flow chart that schematically illustrates a method for receiving and processing a BPDU used in a STP from a MPLS system, in accordance with a preferred embodiment of the present invention.

FIG. 4B is a flow chart that schematically illustrates a method by which the LSRs in system 10 receive and process frame 39 containing BPDU 40, in accordance with a preferred embodiment of the present invention. MPLS label handler 34 in the receiving LSR pops labels off the label stack at a pop label step 56, in accordance with normal MPLS processing conventions. The label handler determines that stack flag bit 46 is set in routing label 44, at a stack bit checking step 57. It consequently pops the next MPLS label off the label stack, in this case BPDU identifying label 42. The label handler examines the routing label for the agreed-upon value at a BPDU test step 58. If the result is negative, the MPLS label handler processes and forwards the frame using standard MPLS routing procedures, in a process frame step 60.

If the test result at step 58 is positive, the label handler passes the underlying BPDU 40 to BPDU handler (FIG. 2) for STP processing, at a process BPDU step 62. As described in the Background to the Invention, the STP process at each LSR decides which LSP segments connected to the LSR should be used, and which should be put into the blocking state, in order to eliminate loops from the TLS topology. Subsequent STP responses to the root bridge are forwarded using the same encapsulation method, as shown in FIG. 3.

Returning to example TLS network 12 in FIG. 1, the network as configured comprises a loop of LSP segments 23, 25, 26, 27 and 24. After successful negotiation of the STP information, one of the segments will be set to the blocking state in TLS network 12 in order to eliminate the loop. This means, for example, that traffic from user 14 to user 16 will be carried only over the path comprising segments 23, 25 and 26, while segment 24 is blocked.

A given LSP may participate in multiple different TLS instances. For example, compare the TLS network described above to a second TLS network, set up by a different network operator, which comprises the entire first TLS network and additionally carries traffic from user 16 to a user 38. Both TLS networks carry traffic over MPLS system 10, but the operators of the different TLS networks may have different operating agreements with the provider of MPLS system 10. Factors such as quality of service or licensing agreements between the operators and the provider may affect the path costs in STP negotiations. For instance, segment 23 may comprise an expensive but fast network component. While the operator of TLS network 12 may prefer to increase network speed and thus gives segment 23 a low path cost, the operator of the second TLS network may prefer to avoid the expensive segment and thus gives segment 23 a high path cost. STP in the second TLS network optimally resolves into a different active topology from the one in TLS network 12.

The term virtual channel is used in the MPLS art to describe a particular instance of a LSP as it relates to a single TLS. Because a single segment in system 10 may be a part of multiple different TLS networks, the LSRs in MPLS system 10 must be able to distinguish between STP traffic carried over different virtual channels, even when they are instances of the same LSP.

Figure 5A:
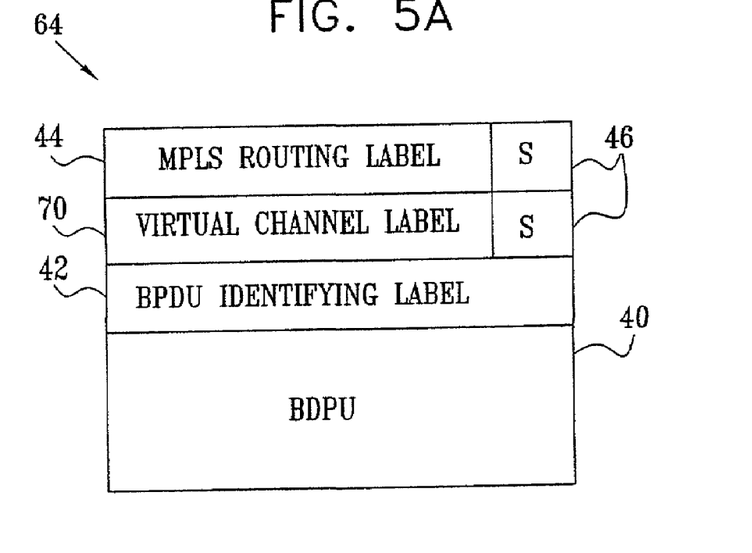
FIG. 5A is a schematic diagram that illustrates addition of a virtual channel label to an encapsulated BPDU, in accordance with an embodiment of the present invention.

FIG. 5A is a schematic diagram that illustrates a MPLS frame 64 that encapsulates BPDU 40 using a virtual channel label 70, according to a preferred embodiment of the present invention. Virtual channel label 70 is pushed onto the label stack between label 42 and label 46 by BPDU labeler 37. The extra virtual channel label is preferably constructed as described in the above-mentioned Internet drafts by Martini. Alternatively, other virtual channel labeling schemes may be used. Label 70 enables the LSRs in system 10 to identify the TLS to which this BPDU belongs.

Figure 5B:
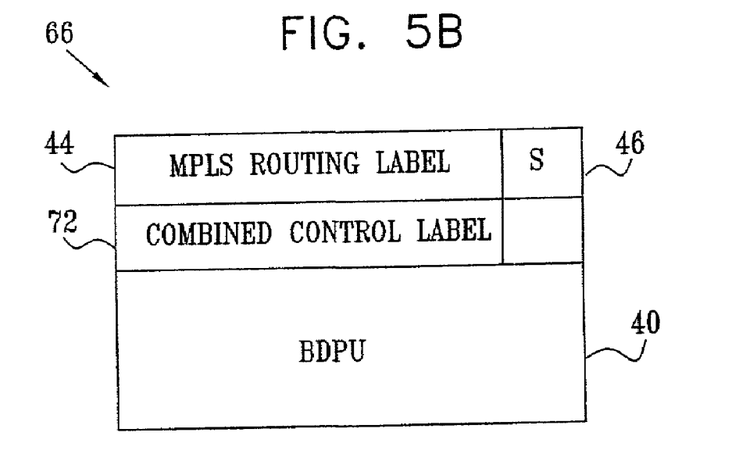
FIG. 5B is a schematic diagram that illustrates another method of encapsulation of a BPDU used in a STP, in accordance with an alternative embodiment of the present invention.

FIG. 5B is a schematic diagram that illustrates a MPLS frame 66 that encapsulates BPDU 40 using a compound label 72, in accordance with another embodiment of the present invention. In this embodiment, the virtual channel label and the agreed-upon value held by BPDU identifying label 42 are combined into compound label 72. The combined label is pushed onto the label stack by BPDU labeler 37. The compound label is parsed by the egress LSR, to determine both that the label comprises the agreed upon value (indicating that this is a STP frame) and to identify the virtual channel. The LSR processes the combination of the STP information in the transmitted frame and the virtual channel information to maintain an independent active topology for each TLS.

Although preferred embodiments described herein are based on specific procedures and terminology defined by MPLS networks cited above, the principles of the present invention are applicable, as well, to networks and systems of other types. It will thus be appreciated that the preferred embodiment described above is cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
defining a topology of a transparent local area network service (TLS), comprising a system of label-switched tunnels between label-switched routers (LSRs) through a communication network, the TLS having at least first and second endpoints to which first and second user equipment is connected so that the TLS acts as a virtual bridge between the first and second user equipment;
transmitting control frames among the LSRs in the TLS via the label-switched tunnels, each control frame comprising a control traffic label and a bridge protocol data unit (BPDU) in accordance with a spanning tree protocol (STP), the control traffic label indicating to the LSRs that the STP is to be executed by the LSRs without transmission of the BPDU to the user equipment; and upon receiving the control frames at the LSRs, processing the BPDU, responsively to the control traffic label, so as to remove loops in the topology of the TLS irrespective of the user equipment.

2. The method according to claim 1, wherein the label-switched tunnels comprise multiprotocol label switching (MPLS) tunnels.

3. The method according to claim 1, wherein transmitting the control frames comprises pushing the control traffic label onto the control frames at a sending LSR, the control traffic label containing an agreed-upon value indicating that the control frame belongs to the STP, and wherein processing the BPDU comprises popping the control traffic label off the control frames at a receiving LSR.

4. The method according to claim 1, wherein processing the BPDU comprises setting a transmitting state for each of the label-switched tunnels.

5. The method according to claim 4, wherein for at least one of the label-switched tunnels, the transmitting state is set to a blocking state so as to prevent frames from being sent across the at least one of the label-switched tunnels, in order to eliminate a loop in the TLS.

6. The method according to claim 1, wherein transmitting the control frames comprises sending the control frames through the label-switched tunnels that are used for carrying user data in the TLS.

7. The method according to claim 1, wherein the TLS is one of a plurality of transparent local-area network services (TLSs) operative in the communication network, and wherein transmitting the control frames comprises inserting information in the control frames that identifies the TLS among the plurality of TLSs, and wherein processing the BPDU comprises eliminating the loops only from the TLS identified by the control frames.

8. The method according to claim 7, wherein inserting the information in the control frames comprises pushing a channel label onto the control frames, in addition to the control traffic label, so as to identify the TLS.

9. The method according to claim 7, wherein inserting the information in the control frames comprises adding the information that identifies the TLS to the control traffic label.

10. A communication device for operation as one of a plurality of label-switched routers (LSRs) in a transparent local area network service (TLS), which includes a system of label-switched tunnels between the label-switched routers (LSRs) through a communication network, the TLS having at least first and second endpoints to which first and second user equipment is connected so that the TLS acts as a virtual bridge between the first and second user equipment, the device comprising:

one or more ports, adapted to send and receive traffic via the label-switched tunnels; and a traffic processor which is coupled to the one or more ports, and is adapted to transmit control frames to the LSRs in the TLS via the label-switched tunnels, each control frame comprising a control traffic label and a bridge protocol data unit (BPDU) in accordance with a spanning tree protocol (STP), the control traffic label indicating to the LSRs that the STP is to be executed by the LSRs without transmission of the BPDU to the user equipment, wherein the traffic processor is further adapted, upon receiving the control frames, to process the BPDU, responsively to the control traffic label, so as to remove loops in a topology of the TLS irrespective of the user equipment.

11. The device according to claim 10, wherein the label-switched tunnels comprise multiprotocol label switching (MPLS) tunnels.

12. The device according to claim 10, wherein the traffic processor is adapted to push the control traffic label onto the control frames before transmitting the control frames to the LSRs, the control traffic label containing an agreed-upon value indicating that the control frame belongs to the STP, and is further adapted to pop the control traffic label off the control frames upon receiving the control frames.

13. The device according to claim 10, wherein the traffic processor is adapted to set a transmitting state for each of the label-switched tunnels responsively to the BPDUs.

14. The device according to claim 13, wherein for at least one of the label-switched tunnels, the transmitting state is set to a blocking state so as to prevent frames from being sent across the at least one of the label-switched tunnels, in order to eliminate a loop in the TLS.

15. The device according to claim 10, wherein the traffic processor is adapted to send the control frames through the label-switched tunnels that are used for carrying user data in the TLS.

16. The device according to claim 10, wherein the TLS is one of a plurality of transparent local-area network services (TLSs) operative in the communication network, and wherein the traffic processor is adapted to insert information in the control frames that identifies the TLS among the plurality of TLSs, and to process the BPDU so as to eliminate the loops only from the TLS identified by the control frames.

17. The device according to claim 16, wherein the information in the control frames that identifies the TLS comprises a channel label, which is pushed onto the control frames in addition to the control traffic label.

18. The device according to 16, wherein the information in the control frames that identifies the TLS is added to the control traffic label.

19. A communication network, comprising a plurality of label-switched routers (LSRs) arranged to define a transparent local area network service (TLS), which comprises a system of label-switched tunnels between the label-switched routers (LSRs) through the communication network, the TLS having at least first and second endpoints to which first and second user equipment is connected so that the TLS acts as a virtual bridge between the first and second user equipment, wherein each of the LSRs comprises:

one or more ports, adapted to send and receive traffic via the label-switched tunnels; and a traffic processor which is coupled to the one or more ports, and is adapted to transmit control frames to the LSRs in the TLS via the label-switched tunnels, each control frame comprising a control traffic label and a bridge protocol data unit (BPDU) in accordance with a spanning tree protocol (STP), the control traffic label indicating to the LSRs that the STP is to be executed by the LSRs without transmission of the BPDU to the user equipment, wherein the traffic processor is further adapted, upon receiving the control frames, to process the BPDU, responsively to the control traffic label, so as to remove loops in a topology of the TLS irrespective of the user equipment.

* * * * *